United States Patent

[11] 3,580,609

| [72] | Inventor | Michael F. Paielli |
| | | 6841 Harding, Taylor, Mich. 48180 |
| [21] | Appl. No. | 883,072 |
| [22] | Filed | Dec. 8, 1969 |
| [45] | Patented | May 25, 1971 |

[54] FIFTH WHEEL WITH LOAD-TRANSFERRING DEVICE
4 Claims, 6 Drawing Figs.

[52] U.S. Cl...................................................... 280/405, 280/440
[51] Int. Cl....................................................... B62d 53/00
[50] Field of Search........................................... 280/405 (R), 405 (A), 406 (R), 407, 440

[56] References Cited
UNITED STATES PATENTS

| 2,727,755 | 12/1955 | Hume............................ | 280/405A |
| 2,847,230 | 8/1958 | Hendrickson................. | 280/406R |
| 2,941,818 | 6/1960 | Hubbard....................... | 280/405A |
| 2,996,312 | 8/1961 | Paul.............................. | 280/406R |
| 3,136,566 | 6/1964 | Harding........................ | 280/405A |
| 3,227,470 | 1/1966 | Funk............................. | 280/405A |
| 3,363,914 | 1/1968 | Neel.............................. | 280/405A |

*Primary Examiner*—Leo Friaglia
*Attorney*—Adolph G. Martin

ABSTRACT: A fifth wheel for connecting tractors and trailers consisting of a pivoted coupling member having on the forward end thereof a hinged member supported by a pair of inflatable air bags seated on the tractor frame. The air bags are operatively connected into the compressed air system of the tractor through a control valve which enables the driver to distribute the load in the trailer between the steering, driving and trailer axles by varying the pressure in the inflatable air bags.

PATENTED MAY 25 1971
3,580,609
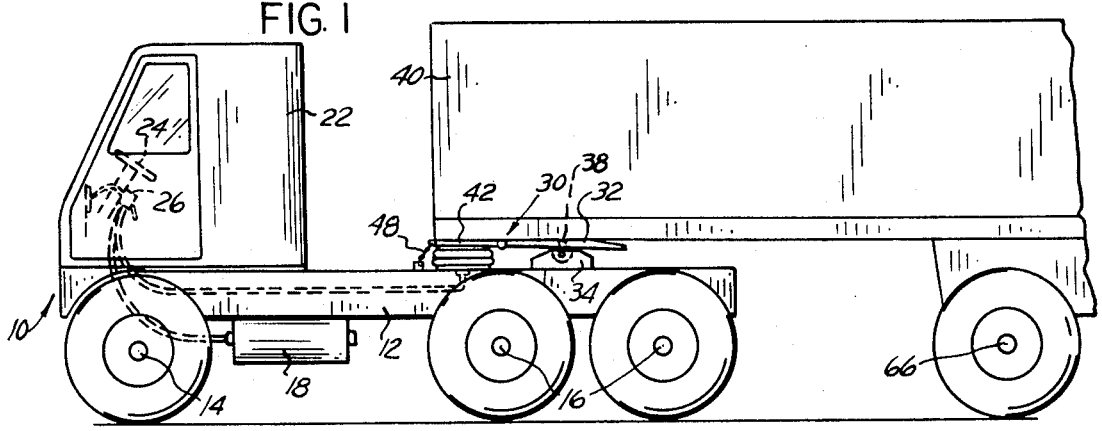
FIG. 1
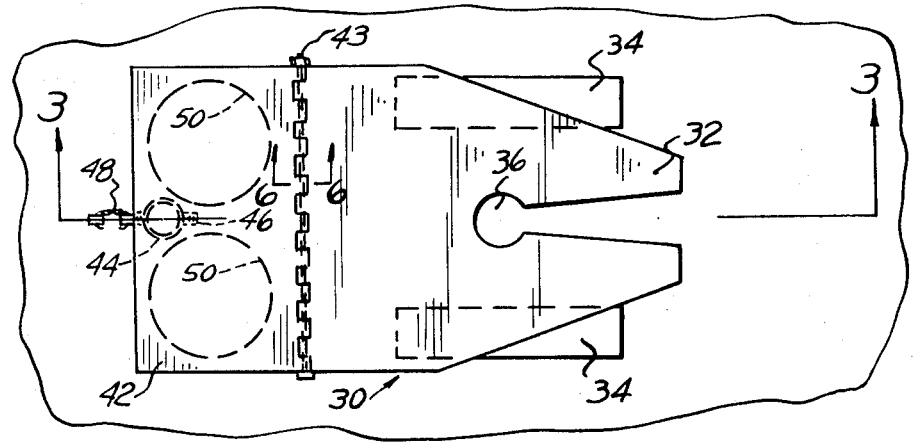
FIG. 2
FIG. 6
FIG. 3
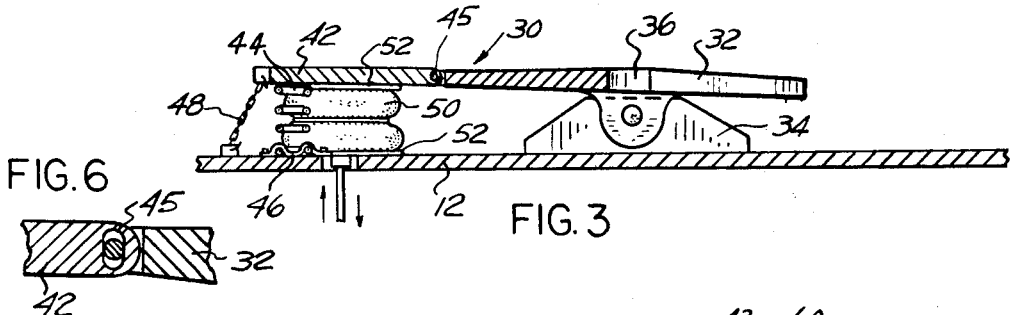
FIG. 4
FIG. 5
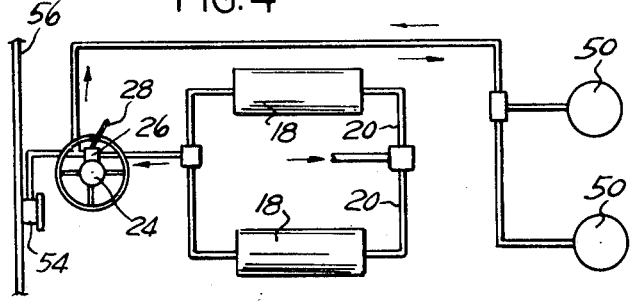
INVENTOR
MICHAEL F. PAIELLI
BY Joseph G. Martin
ATTORNEY

FIFTH WHEEL WITH LOAD-TRANSFERRING DEVICE

BACKGROUND OF THE INVENTION

This invention relates to fifth wheels generally, and more particularly to a type of fifth wheel which is adapted to enable weight to be conveniently shifted to the trailer and steering axles so as to comply with legal requirements relating to load distribution for tractor-trailer hauling units. There are numerous load transferring devices in use by the trucking industry, some of which employ pneumatic means operatively connected between the tractor and trailer frames.

However, such devices require considerable service and maintenance as a result of the constant and continuous stress to which they are subjected during hauling operations due to the relative movement which occurs between the tractor and trailer frames. Such devices are further objectionable because of the severe strain which they place on the trailer king pin, thereby creating the possibility of rupturing the pin and the coupling device and damaging or destroying the trailer and cargo.

SUMMARY OF THE INVENTION

This invention consists of a fifth wheel 30 comprising a pivoted coupling member 32, having a flat member 42, hinged on the forward end. A coil spring 44, mounted on the tractor frame 12, yieldably supports the flat member 42 in a substantially horizontal position. A link chain 48, connected between the tractor frame 12 and the flat member 42, provides an upper limit of travel for the flat member 42.

A pair of laterally spaced inflatable air bags 50 are mounted between the flat member 42 and the tractor frame 12. The air bags 50 are operatively connected to the compressed air tanks 18 on the tractor 10 through a control valve 26 mounted on the steering column 24 in the cab 22 of the tractor 10.

BRIEF DESCRIPTION OF THE DRAWINGS

FIG. 1 is a fragmentary side elevation view, showing a tractor and a trailer unit coupled together by a fifth wheel embodying the applicant's invention.

FIG. 2 is an enlarged plan view of the applicant's fifth wheel, detached from the tractor, and showing structural details of the invention.

FIG. 3 is an enlarged section view, taken substantially on plane 3–3 in FIG. 2, showing the link chain 48 attached to the flat member 42, and the coil spring 44.

FIg 4 is a schematic view showing the air bags 50 and the control valve 26 connected into the compressed air system of the tractor 10.

FIG. 5 is a plan view, showing a modification of the applicant's invention, in which the same is adapted for use with a conventional fifth wheel 64.

FIG. 6 is an enlarged section view, taken substantially on plane 6–6 in FIG. 2, showing the elongated opening 45 in the flat member 42.

CONSTRUCTION

For a more detailed description of the invention, reference is made to the drawing in which numeral 10 designates a tractor comprising a chassis having a frame 12 supported on a steering axle 14 and tandem drive axles 16. A pair of air storage tanks 18 are mounted on the tractor frame 12 and connected by conductors 20 to the compressor, not here shown, in the customary manner.

A cab 22 on the tractor frame 12 has therein a steering column 24 on which is mounted an air control valve 26 having an operator lever 28. A fifth wheel 30, comprising a coupling member 32, is pivotally supported on the frame 12 of the tractor 10 by a bracket 34. The coupling member 32 has therethrough a circular opening 36 for holdably receiving a kingpin 38 for coupling the tractor 10 to a trailer 40 in the conventional manner.

A flat member 42 is pivotally connected to the forward end of the coupling member 32, by a hinge pin 43, passing through an elongated opening 45 in the flat member 42. The flat member 42 is supported in a substantially horizontal position by a coil spring 44 secured to the frame 12 of the tractor 10 by a clamp 46. A link chain 48 is connected between the flat member 42 and the frame 12 of the tractor 10 to provide an upper limit of travel for the flat member 42.

A pair of spaced vertically disposed inflatable air bags 50, between the flat member 42 and the frame 12 of the tractor 10, are mounted thereon by end plates 52. The air bags 50 are connected, through the control valve 26 in the cab 22 of the tractor 10, to the storage tanks 18, as shown in FIGS. 1 and 4 of the drawing. A pressure gauge 54 on the dashboard 56 in the cab 22 of the tractor 10 is connected, as shown in the schematic drawing of FIG. 4, to indicate the pressure in the inflatable bags 50.

The modification of the invention shown in FIG. 5 differs from the embodiment of FIGS. 1 through 3 in that an extension 60 is welded at 62, or otherwise suitably attached, to a conventional fifth wheel 64, thereby adapting it to receive the flat member 42 which is connected to the front end of the extension 60 by a hinge pin 43. In all other aspects, the modification shown in FIG. 5 is identical in structure to the embodiment shown in FIGS. 1 through 3.

The preceding discussion completes a description of the structural details relating to the applicant's invention herein disclosed. However, to facilitate a more thorough and comprehensive understanding of the subject matter, a discussion is immediately hereinafter directed to the manner in which the device operates to accomplish its intended function.

OPERATION

In use, the tractor 10 is coupled to a trailer 40, by means of the fifth wheel 30, in the conventional manner. The trailer 40 is then loaded and the coupled unit driven to a scale where the load being carried by the driving axles 16 is accurately determined. The operator lever 28 on the control valve 26 is then manipulated to inflate the air bags 50 sufficiently to provide the desired shift of load to the steering and trailer axles 14 and 66 respectively.

In this way, the driver by varying the pressure in the air bags 50, can distribute the load over the various axles of the hauling unit so as to comply with the legal requirements relative to the distribution of an allowable load over the steering, driving and trailer axles 14, 16 and 66 respectively. To deflate the air bags 50, when the tractor 10 is not in use, the operator lever 28 is positioned so that the bags 50 discharge to the atmosphere through control valve 26.

Based upon the foregoing discussion, the applicant is of the opinion that his invention has fulfilled a long-felt need in the field of fifth wheels for tractor units, and that he has accordingly made a valuable contribution to the related art. However, while the invention was described with reference to the structural details of two embodiments only, it will be appreciated by those familiar with the art that the principles involved are susceptible of numerous other practical adaptations.

I therefore claim as new, and desire to secure by Letters Patent:

1. A fifth wheel for connecting tractor and trailer units, said tractor unit having a frame supported on steering and drive axles, and said trailer unit having at least one axle and a coupling element, such fifth wheel comprising a coupling member pivotally supported by the tractor frame for holdably engaging the coupling element on the trailer, a flat member hinged on the forward end of the coupling member on the tractor, at least one inflatable air bag connected between the tractor frame and the flat member, and means for controllably inflating the air bag so that the flat member will impart a sufficient upward thrust on the trailer to distribute the load therein over the steering, drive and trailer axles in a preselected manner.

2. The fifth wheel of claim 1, having in addition thereto: resilient means between the tractor frame and the flat member yieldably supporting the flat member in a substantially horizontal position when the air bag is deflated.

3. The fifth wheel of claim 2 having in addition thereto: Flexible means connected between the flat member and the tractor frame providing an upper limit of travel for the flat member when the tractor and trailer units are disconnected and the coupling member on the fifth wheel pivots to an inoperative position of rest.

4. The fifth wheel of claim 1 in which the hinged connection between the flat member and the coupling member provides for relative vertical movement between said two members.